April 20, 1954     W. A. PICKENS     2,675,992
CABLE GUIDE DEVICE
Filed June 12, 1952
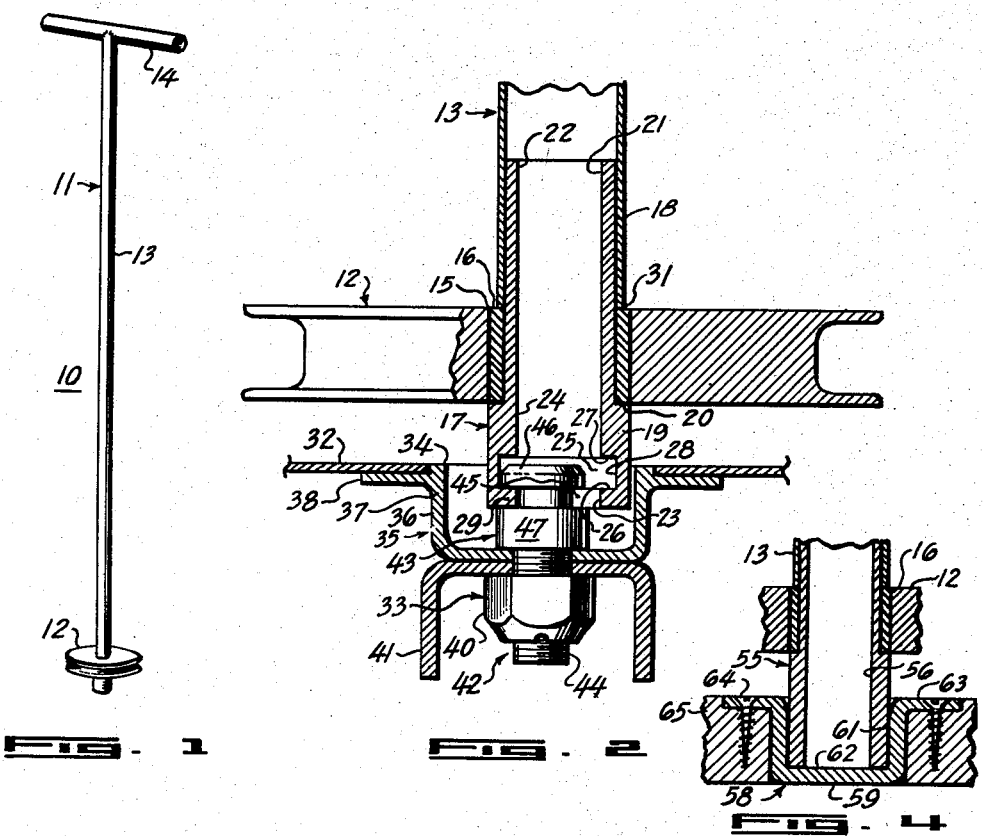
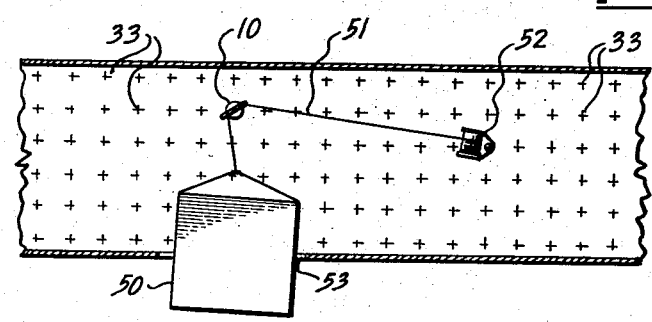
INVENTOR:
William A. Pickens
BY Walter J. Jason
ATTORNEY Patented Apr. 20, 1954

2,675,992

UNITED STATES PATENT OFFICE 2,675,992

CABLE-GUIDE DEVICE

William A. Pickens, San Diego, Calif., assignor to Consolidated Vultee Aircraft Corporation, San Diego, Calif., a corporation of Delaware Application June 12, 1952, Serial No. 293,177

6 Claims. (Cl. 254—190)

This invention relates to cargo handling equipment and more particularly to an improved device for moving and locating cargo within a desired storage area.

An object of the present invention is to provide an improved cable guide device of unique construction which cooperates with fixed elements in a storage area within which cargo is to be located.

Another object of this invention is to provide an improved portable cable guide device which is characterized by simplicity of design and facility of attachment utilizing a rotatively mounted member for cable guidance and an adapter for readily affixing it in operative position.

Another object of the invention resides in providing a portable cable guide device which is economical to manufacture, and is reliable, strong, and simple in construction.

Other objects and features of the present invention will be readily apparent to those skilled in the art from the following specification and appended drawings wherein is illustrated a preferred form of the invention, and in which:

Figure 1 is a perspective view of the cable guide device of the present invention.

Figure 2 is a fragmentary sectional view illustrating the construction for attaching the cable guide device in its operative position.

Figure 3 is a fragmentary sectional view illustrating a portion of the floor area of the cargo carrying airplane with the cable guide device of the present invention applied thereto; and Figure 4 is a sectional view of a modification.

Having reference now with greater particularity to the drawings a cable guide device in accordance with the present invention is indicated as a unit generally by the numeral 10. Cable guide device 10, as shown, comprises a generally T-shaped handle 11 adjacent the lower end of which is rotatably supported a pulley 12. T-shaped handle 11 is formed of an upright tubular member 13 to the upper end of which is affixed, as by welding, a tubular cross-piece 14. Preferably, these two members 13 and 14 are made of steel to enable them to withstand abuse.

Pulley 12 is provided with a central opening 15 within which is rigidly affixed, in any suitable manner, a usual bushing 16. To rotatably mount the pulley 12 to the upright tubular member 13 of handle 11 there is provided an adapter or collar member 17. Adapter 17 is best illustrated in Figure 2. As shown, adapter 17 consists of a body portion 18 of elongated cylindrical form provided at one end with an enlarged cylindrical portion as indicated at 19. This construction effects an annular shoulder 20 upon which the bushing 16 of pulley 12 is adapted to rest. Adapter 17 has a longitudinal passage 21 therethrough which opens to the exterior as at 22 and 23. In the internal walls 24 of the adapter 17 there is formed an annular groove 25 defined by vertically spaced annular shoulders 26 and 27 and an annular wall 28. Providing the groove 25 as described effects an inwardly directed annular flange at lower opening 23. The adapter 17 is preferably formed of hardened steel to enable it to withstand large working loads.

As shown in Figure 2 pulley 12 is adapted to be fitted upon adapter 17 to rest upon an annular shoulder 20 thereof to be positioned thereby intermediate the ends of adapter 17. The external diameter of body portion 18 of adapter 17 is sufficiently smaller than the diameter of the opening of bushing 16 that pulley 12 will rotate freely upon the support offered by adapter 17. Pulley 12 may be formed of steel, aluminum, Micarta or any other suitable material.

To mount pulley 12 in operative position upon T-handle 11 the portion of adapter 17 which extends above pulley 12 is fitted into the lower end of upright tubular member 13 and is rigidly secured thereto as by a drive fit or by brazing or welding, or in any other well known manner. With this construction the position of pulley 12 is fixed relative to T-handle 11 and adapter 17. Bushing 16 of pulley 12 will lie disposed between the lower end 31 of T-handle 11 and annular shoulder 20 of adapter 17. The spacing between lower end 31 and annular shoulder 20 is sufficiently large that there will be no binding of bushing 17 and pulley 12 is free to rotate about body portion 18 of adapter 17.

Figure 2 illustrates the mounting of cable guide device 10 in an operative position upon a supporting structure indicated generally at 32, which supporting structure is here assumed to be the floor of a cargo carrying aircraft. It is understood, however, that the present invention is not to be confined to use with aircraft. It is adapted for use in any storage area whether it be a vehicle, such as a truck or railroad car, or a building such as a warehouse, provided the floor of such areas has been outfitted with attachment fittings suitable to maintain the handle 11 in upright position.

Fitting 33 shown in Figure 2 is a conventional type ordinarily utilized by aircraft where it serves a multiplicity of purposes. It may be utilized for securing usual cargo tying or hitching assemblies, securing the tubular legs of chairs, or for like purposes. As shown, fitting 33 is disposed within an aperture 34 formed in the flooring. It is held in position centrally of the aperture 34 by a socket or bracket 35 which embodies a generally cup-shaped body portion 36 the upper end of whose annular defining wall 37 projects into aperture 34. Socket 35 has a laterally extending flange 38 by means of which it may be secured to the floor 32 as by brazing or welding since the floor 32 and the socket are here being used in aircraft and are preferably formed of aluminum. The socket 35 rests upon the bight portion of a U-channel 41 which forms a part of the flooring sub-structure.

Attachment fitting 33 comprises an anchor bolt 42 having an elongated shank 43 with a reduced threaded portion 44 which projects through aligned openings in socket 35 and the bight of U-channel 41 and accepts a nut 40 to affix bolt 42 rigidly centrally of aperture 34. Shank 43 is afforded an annular groove 45 to effect a head 46 and an enlarged body portion 47. Enlarged body portion 47 rests upon the base of socket 35 and cooperates with nut 40 to clamp bolt 42 in place. Head 46 is of smaller diameter than opening 23 in adapter 17 which permits head 46 to enter therewithin. The top surface of head 46 lies in or slightly below the plane of floor 32. Groove 45 is of a sufficient size to accommodate inwardly directed flange 29 of adapter 17 for mounting unit 10 in position, as will be hereinafter described fully.

It is understood that the particular construction of attachment fitting 33 and of the structure which affixes it to the flooring is not a part of the present invention. Any device by means of which adapter 17 may be releasably affixed to a floor may be utilized and is within the contemplation of the present invention.

To position cable guide device 10 operatively upon floor 32 the adapter 17 is positioned over an attachment bolt 42 and moved downwardly to pass bolt head 46 through the lower opening 23 in adapter 17. The unit 10 is then shifted in the direction of the pulling force which is to be applied upon pulley 12. This shifting movement projects head 46 within groove 25 of adapter 17 and extends a portion of adapter flange 29 into groove 45 of bolt 42 whereby flange 29 will be clamped between head 46 and enlarged bolt portion 47. This disposition of head 46 and flange 29 obviously prevents vertical displacement of the cable guide device 10 and prevents lateral shifting during the cargo moving operation.

As shown diagrammatically in Figure 3 the aircraft floor 32 is provided with a multiplicity of attachment fittings 33 disposed in a grid pattern. Each fitting 33 is of the construction shown in Figure 2 and as above described. An article to be located within the aircraft is indicated at 50 and has a cable 51 secured about it which leads to a usual motor 52. A cable guide device 10 is shown operatively secured to a fitting 33 and intermediate the load 50 and motor 52 and cable 51 extends from cargo piece 50 around pulley 12 thereof and to the motor 52. The cargo piece 50 may be mounted on a skid or a castered platform for ease of movement. Cargo piece 50, as shown, has entered a substantial distance into the aircraft through the door 53 thereof. After the cargo piece 50 has been hauled completely within the aircraft it may then be shifted to any desired spot by lifting the cable guide device 10 and moving it for cooperation with other attachment fittings 33. It is obvious that by judiciously locating the cable guide device 10 the cargo piece 50 can be made to move in any desired direction to any desired area.

Figure 4 illustrates a modification of the present invention. It is a construction preferred and suitable for use in warehouses, railroad cars, trucks, and the like storage areas. The modification differs from the above described embodiment as to the form of adapter employed and the construction of the attachment fitting cooperating therewith. The handle, the pulley and the manner of affixing the pulley to the handle are understood to be the same as in the first embodiment. The adapter, which is designated by the numeral 55, differs from adapter 17 in that the interior wall 56 of the longitudinal passage extending through adapter 55 is smooth-faced, there is no groove, similar to groove 25 afforded in the wall. Adapter 55 cooperates with an attachment fitting 58 which comprises a socket member 59. Socket 59, as shown, is of generally cup-shaped form having upright walls 61 and a base 62. An annular flange 63 projects outwardly from walls 61 and has openings therein to accommodate screws 64 which serve to secure socket 59 to the floor which is indicated generally at 65, of the storage area. The exact manner of securing sockets 59 is not part of the present invention, any usual and suitable method or means may be employed. Adapter 53 is adapted to be inserted into socket 59 to rest its lower end upon base 62 thereof. Of primary concern is that the pocket of socket 59 be of a diameter which is sufficiently larger than the diameter of adapter 55 and is sufficiently deep that adapter 55 will be accommodated therein, and the handle 11 will be held in substantially upright position, and walls 61 will not permit handle 11 to tip or move from the vertical to an extent which would prevent efficient use of the pulley 12 carried thereon. Adapter 55 will be maintained within socket 59 by downward pressure being exerted by the operator on handle 11.

Adapter 55 may be utilized with attachment fitting 33 which includes bolt 42. In such case the adapter would fit over bolt 42 and this would prevent horizontal shifting of the cable guide device 10. Vertical displacement would be prevented by the operator maintaining downward pressure on handle 11.

What I claim is:

1. A cable guide device comprising a tubular handle portion, a pulley, and an adapter having an elongated body portion which projects for a portion of its length within an open end of said tubular handle portion and is secured therewithin, a support on said body portion mounting said pulley for rotative movement, and means on said adapter for releasably securing said adapter to an attachment fitting.

2. A cable guide device comprising a tubular handle portion, a pulley, and an adapter having an elongated body portion inserted within an end of said tubular handle portion and secured thereto, a shoulder on said body portion supporting said pulley for rotative movement, and integral means on said adapter for releasably connecting said adapter to an attachment fitting.

3. A cable guide device comprising a handle embodying an elongated tubular member, a pulley, and an adapter having an elongated body portion of generally cylindrical form having a portion of its length received within one end of said tubular member and secured thereto, an annular shoulder on said body portion supporting said pulley for rotative movement, said annular shoulder spaced from the lower end of said tubular member, said annular shoulder and said lower end cooperating to confine said pulley against displacement longitudinally of said tubular member, and means on said adapter for releasably connecting said adapter to an attachment fitting.

4. A cable guide device comprising a tubular handle portion, a pulley, and an adapter having an elongated body portion inserted within an end of said tubular handle portion and secured thereto, a shoulder on said body portion supporting said pulley for rotative movement, said adapter having a portion extending below the support of said pulley adapted to be received within a socket of an attachment fitting to maintain the handle in upright position and against horizontal shifting.

5. A cable guide device comprising a handle embodying an elongated tubular member, a pulley, and an adapter having an elongated body portion of generally cylindrical form having a portion of its length received within one end of said tubular member and secured thereto, an annular shoulder on said body portion rotatively supporting said pulley intermediate the ends of said adapter, said annular shoulder spaced from the lower end of said tubular member, said annular shoulder and said lower end cooperating to confine said pulley against displacement longitudinally of said tubular member, a portion of said adapter extending below said pulley adapted to be received within an aperture provided by an attachment fitting to maintain the handle in upright position and against horizontal shifting.

6. A cable guide device comprising a tubular handle portion, elongated connecting means having a portion thereof projected into an open end of said tubular handle portion and secured therewithin, said connecting means adapted to releasably support an end of said handle portion to an attachment fitting, and a pulley rotatably supported on said connecting means.

References Cited in the file of this patent

UNITED STATES PATENTS

| Number | Name | Date |
|---|---|---|
| 2,202,184 | Berger | May 28, 1940 |
| 2,563,651 | Hurst | Aug. 7, 1951 |